US010409850B2

(12) United States Patent
Valdez Klein et al.

(10) Patent No.: US 10,409,850 B2
(45) Date of Patent: Sep. 10, 2019

(54) PRECONFIGURED MEDIA FILE UPLOADING AND SHARING

(75) Inventors: Teresa Valdez Klein, Seattle, WA (US); Michael Bibik, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 191 days.

(21) Appl. No.: 13/072,628

(22) Filed: Mar. 25, 2011

(65) Prior Publication Data

US 2012/0226663 A1 Sep. 6, 2012

Related U.S. Application Data (60) Provisional application No. 61/448,644, filed on Mar. 2, 2011.

(51) Int. Cl.
*G06F 16/40* (2019.01)
*G06F 16/13* (2019.01)

(52) U.S. Cl.
CPC .............. *G06F 16/40* (2019.01); *G06F 16/13* (2019.01)

(58) Field of Classification Search
CPC ......... G06F 17/30017; G06F 17/30029; G06F 17/30067; G06F 17/30091; G06F 17/30215; G06F 17/30286; G06F 16/40; G06F 16/13
See application file for complete search history.

(56) References Cited

U.S. PATENT DOCUMENTS

| | | | | |
|---|---|---|---|---|
| 8,353,012 B2 * | 1/2013 | Del Real | ............ | G06F 21/6218 705/326 |
| 8,862,654 B1 * | 10/2014 | Cohen | ............... | H04N 21/2541 709/200 |
| 2001/0047348 A1 * | 11/2001 | Davis | ...................... | G06F 16/40 |
| 2003/0028652 A1 * | 2/2003 | Bardini et al. | ............... | 709/229 |
| 2006/0184673 A1 * | 8/2006 | Liebman | ...................... | 709/225 |
| 2007/0033402 A1 * | 2/2007 | Williams | ............... | G06Q 30/02 713/169 |
| 2007/0101387 A1 * | 5/2007 | Hua | ................... | G06F 17/30793 725/113 |
| 2007/0124319 A1 * | 5/2007 | Platt | ................... | G06F 17/30038 |
| 2007/0150484 A1 * | 6/2007 | Funge | ...................... | G06F 16/51 |
| 2007/0282907 A1 * | 12/2007 | Chambers | ......... | G06F 17/30041 |
| 2008/0091717 A1 * | 4/2008 | Garbow | ............ | G06F 17/30749 |
| 2008/0177713 A1 * | 7/2008 | Armstrong | ............ | G06Q 30/02 |
| 2009/0100093 A1 * | 4/2009 | Makipaa | ................. | G06F 16/68 |
| 2009/0164606 A1 * | 6/2009 | Epifania et al. | ............. | 709/219 |
| 2009/0254934 A1 * | 10/2009 | Grammens | ............ | H04H 60/33 725/14 |
| 2010/0114968 A1 * | 5/2010 | Dean | ................. | G06F 17/30749 707/796 |

(Continued)

*Primary Examiner* — Hasanul Mobin
(74) *Attorney, Agent, or Firm* — Han Santos, PLLC (57) ABSTRACT

A client application may be utilized to enter a user's media storage settings, to store media files locally, and to upload the media files to a cloud-based platform. The cloud-based platform may facilitate storage of the uploaded media files in accordance with an appropriate one of the media storage settings, and further facilitate sharing at least a portion of the uploaded media files to a social media network in accordance with an appropriate one of the media storage settings. This Abstract is submitted with the understanding that it will not be used to interpret or limit the scope or meaning of the claims.

17 Claims, 5 Drawing Sheets

(56) References Cited

U.S. PATENT DOCUMENTS

| | | | |
|---|---|---|---|
| 2010/0332483 A1* | 12/2010 | Brownell | G06F 16/4387 707/754 |
| 2010/0332549 A1* | 12/2010 | Nichols et al. | 707/802 |
| 2011/0093941 A1* | 4/2011 | Liu et al. | 726/7 |
| 2011/0137894 A1* | 6/2011 | Narayanan | G06F 17/3089 707/723 |
| 2011/0145427 A1* | 6/2011 | Amento | H04L 65/1016 709/231 |
| 2011/0246294 A1* | 10/2011 | Robb et al. | 705/14.52 |
| 2012/0108293 A1* | 5/2012 | Law | G06F 16/4393 455/557 |
| 2012/0123831 A1* | 5/2012 | King | G06Q 30/0274 705/14.7 |
| 2012/0158713 A1* | 6/2012 | Jin | G06F 16/435 707/728 |

\* cited by examiner

PRECONFIGURED MEDIA FILE UPLOADING AND SHARING

RELATED APPLICATIONS

This application claims priority benefit of U.S. Provisional Application 61448644, which was filed on Mar. 2, 2011. The entire contents of the Provisional Application are hereby incorporated herein by reference.

BACKGROUND

Couple the pervasiveness of digital consumer electronic image-capturing devices, e.g., mobile phones, etc., with the burgeoning use of online social networks, e.g., Facebook, Twitter, Foursquare, etc., and a race to share digital media in a real-time fashion is borne of personal desire, occupational ambition, or even civic responsibility.

For instance, personal desire may influence a user at a special event to share her digital media, e.g., pictures or videos, in real-time with friends and family who are unable to attend the event. Professional ambition may influence a user to share her digital media to show leadership in her chosen field, such as when an attendee shares pictures and commentary during proceedings at a professional conference. Civic responsibility may influence a user to share her digital media from a site of interest such as a political rally, civic demonstration, or natural disaster as events unfold.

Regardless of the motivation to share digital media in real-time, it is likely that the practice of posting digital media to a social network, soon after capture of the digital media, is one that will only gain in prevalence.

SUMMARY

Described herein are systems, apparatuses, methods, and techniques related to digital media file storage and sharing. For example, a client application may be utilized to enter a user's media storage settings, to store media files locally, and to upload the media files to a cloud-based platform. The cloud-based platform may facilitate storage of the uploaded media files in accordance with an appropriate one of the media storage settings, and further facilitate sharing at least a portion of the uploaded media files to a sharing site or service in accordance with an appropriate one of the media storage settings.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are techniques related to preconfigured media file uploading and sharing.

Figure 1:
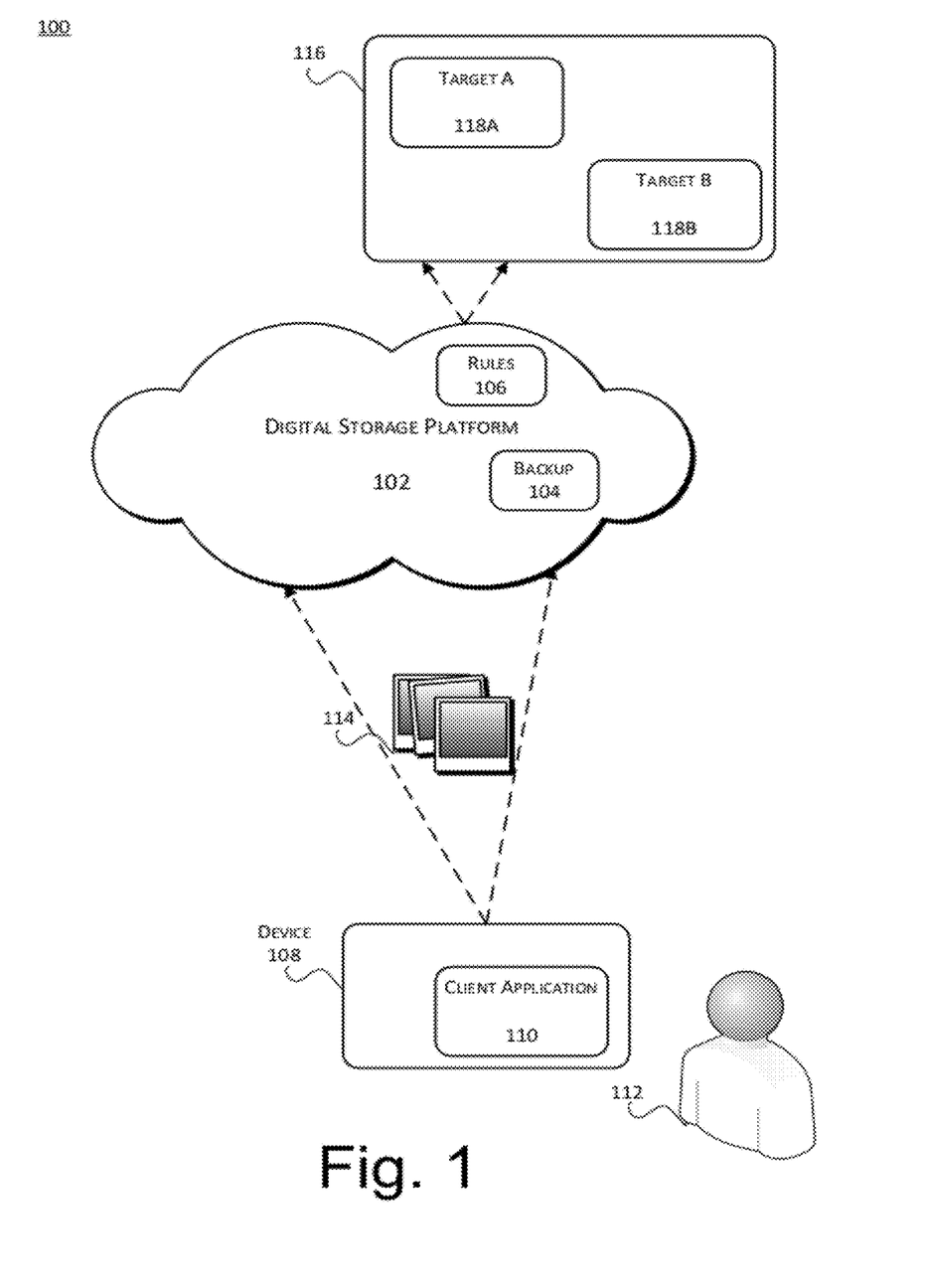
FIG. 1 shows an overview of an example system for implementing at least one embodiment of preconfigured media file uploading and sharing.

FIG. 1 shows an overview of an example system for implementing at least one embodiment of preconfigured media file uploading and sharing. As depicted, system 100 includes digital storage platform 102, with backup 104 and rules 106, client device 108 hosting an instance of client application 110, and destination social network 116, or other target, with available target folders target A 118A and target B 118B.

A digital storage platform 102 may be regarded as a cloud-based storage and dissemination platform that may include a framework of hardware, software, firmware, or any combination thereof, to which digital media files 114 may be stored or from which digital media files 114 may be shared. More particularly, digital storage platform 102 may be implemented as a web-based storage and sharing service to which a user 112 registers prior to use. Such registration may include pre-configuration of user preferences or settings for storing digital media files 114 on digital storage platform 102 and sharing of any of the stored digital media files 114 to a destination sharing site or service 116. The registration, including pre-configuration of user preferences or settings, may be performed in coordination with an instance of a client application 110 hosted on a client device 108. The registration may further include pre-authenticating user 112 to have storage and/or sharing access to both digital storage platform 102 and sharing site or service 116, particularly target A 118A and target B 118B. Such pre-authenticating may include storing credential and/or tokens to authenticate user 112 on either or both of the digital storage platform 102 and sharing site or service 116.

A backup 104 may include storage, implemented as hardware, software, firmware, or any combination thereof, corresponding to digital storage platform 102. Uploaded digital media files 114 may be stored on backup 104, and the stored digital media files 114 may be shared from backup 104 to web-based services, e.g., destination sharing site or service 116, to which digital storage platform 102 is communicatively coupled.

Rules 106 may include one or more media storage settings, i.e., the aforementioned preconfigured user preferences or settings, which are communicatively received at digital storage platform 102 from an instance of client application 110 hosted on client device 108. Rules 106 may include logic implemented by hardware, software, firmware, or any combination thereof, to appropriately filter any sharing of uploaded digital media files 114 stored on backup 104 to destination sharing site or service 116, in accordance with the media sharing settings.

Client device 108 may include a processor-based device on which an instance of client application 110 is hosted to implement at least portions of preconfigured media file uploading and sharing. Alternatively client application 110 may run on a browser hosted on client device 108. More particularly, client device 108 may be an electronic file-capturing device, e.g., mobile phone, etc., that may be communicatively connected to the internet or some other communication infrastructure on which digital storage platform 102 may be hosted.

User 112, in possession of client device 108, may register and enter her preferences for the storage and/or the sharing of digital media files 114 captured on client device 108. The registration and entry of user preferences or settings for storing digital media files 114 and sharing any of such stored digital media files 114, i.e., pre-configuration, may be performed by hardware, software, firmware, or any combination thereof, at digital storage platform 102, corresponding to the logic of rules 106.

The preconfigured user preferences or settings for storing digital media files 114 and sharing any of such stored digital media files 114 may include preferences of user 112 including, but not limited to: a local mode by which digital media files 114 captured by client device 108 are stored locally on client device 108; a backup mode by which digital media files 114 captured by client device 108 are stored locally on client device 108 and also automatically uploaded to digital storage platform 102 to be stored on a folder for user 112 on backup 104; and a share mode by which digital media files 114 captured by client device 108 are stored locally on client device 108, automatically uploaded to digital storage platform 102 to be stored on the folder for user 112 on backup 104, and automatically shared to a folder designated by user 112 on destination sharing site or service 116.

The pre-configuration of user preferences or settings for storing digital media files 114 and sharing of any of such stored digital media files 114 may facilitate what may be referred herein as either no-click or zero-click uploading of digital media files and pass-through sharing. No-click, or zero-click, uploading of digital media files and pass-through sharing may be implemented independently and serially, with pass-through sharing implemented as an extension of no-click uploading. Common to both is that, after the pre-configuration of user preferences, the storing and/or sharing may be executed without user activation subsequent to capturing new digital media files.

Destination sharing site or service 116 may include a website, or other web-based service, to which digital storage platform 102 may be integrated utilizing one or more APIs (application programming interfaces), which are typically made available by hosts of sharing site or service 116. Examples of sharing site or service 116, including similar web-based services, include, but are not limited to: Facebook™, MySpace™, Twitter™, Linkedin™, Ning™, Yelp™, Flickr™, Photobucket™, Picasa™, and Shutterfly™; or even web-based services for retail services which include, but are not limited to: FedEx Office™, UPS™, Costco™, Office Depot™, Office Max™, etc. at which the shared media may be received to be stored and/or produced in hard-form.

The embodiments of preconfigured media file uploading and sharing described and/or recited herein are not limited to include destination sharing site or service 116. That is, any implementation of destination sharing site or service 116 may alternatively include a web-based service or portal by which registered users may share content, including but not limited to digital media files, with other registered users who have been granted access thereto. Such web-based service or portal, similar to destination sharing site or service 116, may include target folders, e.g., target folders 118A and 118B, to which content may be targeted for pass-through sharing, as described herein.

The integration of digital storage platform 102 and destination sharing site or service 116 may enable user 112 to preconfigure her preferences to share at least some of the digital media files 114, which may be automatically stored to backup 104, with third parties who are have authorized viewing access to a targeted folder of target A 118A or target B 118B.

Figure 2:
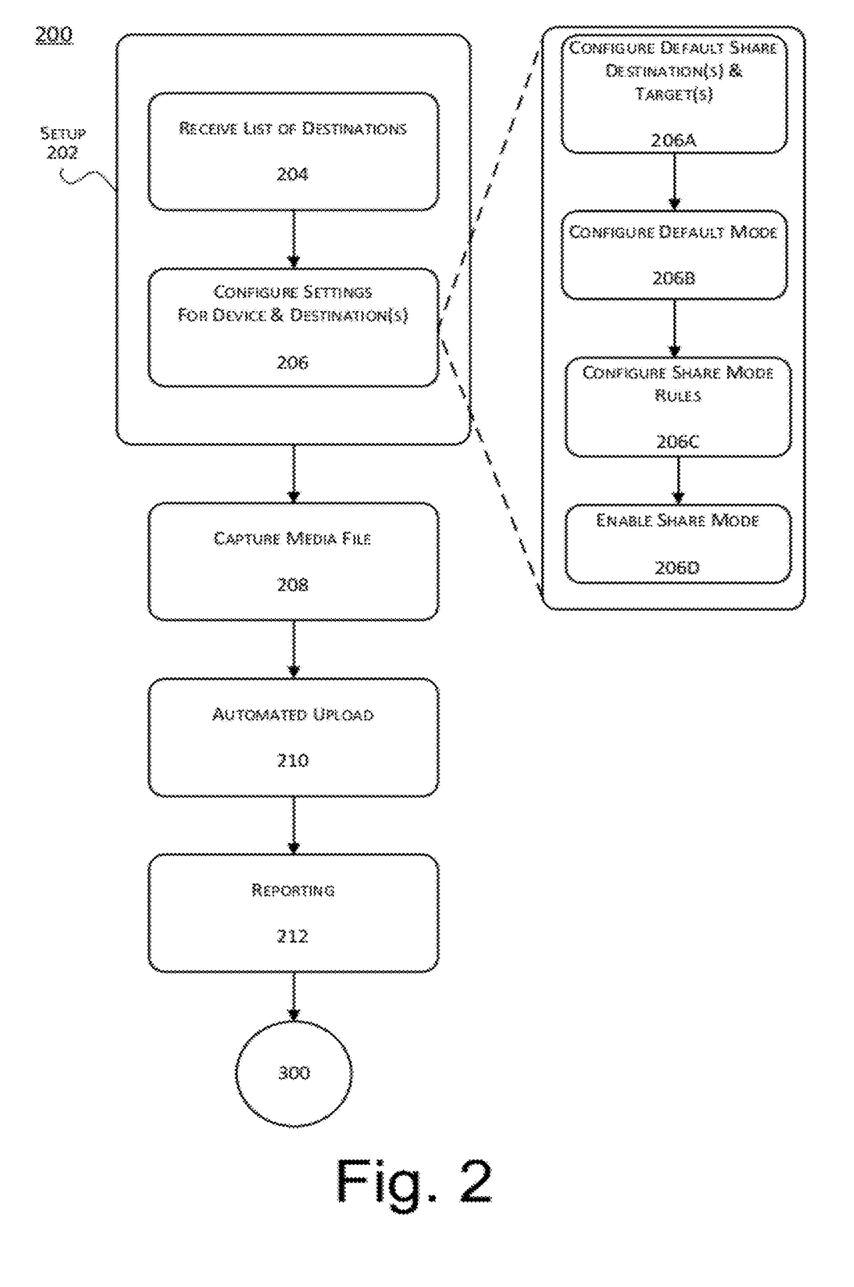
FIG. 2 shows a processing flow for at least an example client application in accordance with one or more embodiments of preconfigured media file uploading and sharing.

FIG. 2 shows a processing flow for at least an example client application in accordance with one or more embodiments of preconfigured media file uploading and sharing.

Example processing flow 200 may include one or more operations, actions, or functions as illustrated by one or more of blocks 202, 204, 206 208, 210, 212, and/or 300. Although illustrated as discrete blocks, various blocks may be divided into additional blocks, combined into fewer blocks, or eliminated, depending on the desired implementation. Further, in accordance with a first example embodiment, processing flow 200 is described in the context of client device 108 on which an instance of client application 110 is hosted to facilitate preconfigured media file uploading and sharing. Processing flow 200 may begin at block 202.

Block 202 (Setup) may include client application 110, in coordination with digital storage platform 102, registering, or configuring, user preferences or settings for storing digital media files 114 on digital storage platform 102 and sharing any of such stored digital media files 114 to destination sharing site or service 116. The aforementioned settings may be regarded are instructions to be implemented by various components or sub-components of system 100, either singularly or in combination.

Block 202 may include sub-blocks 204 and 206, and sub-block 206 may include further sub-blocks 206A, 206B, 206C, and 206D. It is noted that for all sub-blocks corresponding to block 202, though user 112 may interact with client application 110, the pre-configuration of preferences, settings, and/or rules is indeed implemented by client application 110 in coordination with digital storage platform 102.

Sub-block 204 (Receive List of Destinations) may include a list of eligible destination sharing sites or services or other such web-based services that may be made available, subsequent to completion of an implementation of no-click uploading, for pass-through sharing of digital media files 114 captured by device 108 for user 112 being received by the instance of client application 110 hosted on client device 108. Processing flow 200 may proceed to block 206.

Sub-block 206 (Configure Default Settings for Device & Destinations) may include user 112 interacting with client application 110, in coordination with digital storage platform 102, to preconfigure settings for storing captured digital media files 114 on client device 108 and at backup 104 on digital storage platform 102 as well as for sharing any of the stored digital media files 114 to a targeted one of folders target A 118A and target B 118B on sharing site or service 116. Sub-blocks 206A, 206B, 206C, and 206D recite sub-processes that make up block 206, though the further sub-blocks are not necessarily exclusive.

Sub-block 206A (Configure Default Share Destination(s) & Target(s)) may include user 112 interacting with client application 110, in coordination with digital storage platform 102, to select destination sharing site or service 116 from among the list of eligible destination sharing sites or services received at block 204, as well as target one of folders target A 118A and target B 118B to which any of uploaded digital media files 114 may be shared.

Sub-block 206B (Configure Default Mode) may include user 112 interacting with client application 110, in coordination with digital storage platform 102, to configure a default mode for storing captured digital media files 114 on client device 108 and at backup 104 on digital storage platform 102, as well as for sharing any of the stored digital media files 114 to one of folders target A 118A and target B 118B on destination sharing site or service 116.

A typical default mode configured at sub-block 206B may include a backup mode by which digital media files 114 captured by client device 108 may be stored locally on client device 108 and may also be stored on a folder for user 112 on backup 104. Such default mode provides a high level of security and privacy for user 112.

Other non-exclusive options for the default mode configured at sub-block 206B may include a local mode by which digital media files 114 captured by client device 108 may be stored locally on client device 108; and a share mode by which digital media files 114 captured by client device 108 may be stored locally on client device 108, automatically stored on the folder for user 112 on backup 104, and automatically shared to a targeted one of folders target A 118A and target B 118B on destination sharing site or service 116.

Sub-block 206C (Configure Share Mode Rules) may include user 112 interacting with client application 110, in coordination with digital storage platform 102, to configure rules for sharing digital media files 114 to a targeted one of folders target A 118A and target B 118B at destination sharing site or service 116. More specifically, when the preconfigured settings include sharing any of the stored digital media files 114 to one of folders target A 118A and target B 118B on sharing site or service 116, some of the preconfigured settings may be implemented as rules 106, by which certain ones of digital media files stored at backup 104 may be prohibited from being shared.

Reasons for such exclusions may be based on, e.g., user preferences, privacy desires, and safety needs. Such user preferences may be based on personal discretion or preferences. Privacy desires may include user 112 not wanting to make known her present location which, in some cases, may be inferred from digital media files 114; and safety needs may include a user 112 not wanting to share digital media files 114 for more compelling privacy reasons that include, e.g., prohibiting publication and sharing of images of children under five years old. Regardless, the exclusionary settings may be implemented by rules 106, which may include logic implemented by hardware, software, firmware, or any combination thereof, to appropriately filter the sharing of uploaded digital media files 114 stored on backup 104 to a targeted folder on destination sharing site or service 116 by, e.g., applying the exclusionary settings to tags or metadata applied to all of stored digital media files 114 prior to sharing.

The aforementioned reasons are provided only as examples to make the point that user 112 may desire to exercise caution and not have every one of digital media files 114 that is automatically uploaded to digital storage platform 102 automatically shared to a sharing site or service, in spite of preconfigured settings to that effect.

Sub-block 206D (Enable Share Mode) may include user 112 interacting with client application 110, in coordination with digital storage platform 102, to enable pass-through sharing of digital media files 114 subsequent to completion of an implementation of no-click uploading, i.e., after digital media files 114 are automatically uploaded to digital storage platform 102 for storage at backup 104. Enabling of share mode may be implemented when the default mode configured at sub-block 206B includes either the local mode by which digital media files 114 captured by client device 108 are stored locally on client device 108 or the backup mode by which digital media files 114 captured by client device 108 are stored locally on client device 108 and also uploaded to be stored on backup 104. Client application 110 may include a default feature, which may be overridden, by which any enablement of the share mode is only for a pre-set amount of time. The pre-set amount of time may be dynamically selected by user 110 or it may be subject to a default time limit, e.g., two hours. Regardless of the pre-set amount of time or how the expiration time setting is established, the pass-through sharing may implement this privacy safety feature for user 112. Processing flow 200 may proceed to block 208.

Block 208 (Capture Media File) may include digital media files 114 being captured on device 108. Digital media files 114 may include digital photograph files, digital video files, digital audio files, or any combination thereof. Processing flow 200 may proceed to block 210.

Block 210 (Automated Upload) may include client application 110, in coordination with digital storage platform 102, completing an implementation of no-click uploading, i.e., storing the captured digital media files 114 locally on client device 108 and automatically uploading the captured digital media files 114 to digital storage platform 102 for further private storing at backup 104. Processing flow 200 may proceed to block 210.

Block 212 (Reporting) may include client application 110, in coordination with digital storage platform 102, providing an indication of the completion of no-click uploading executed at block 210. Processing flow 200 may proceed to 300, which represents the pass-through sharing depicted and described with regard to FIG. 3.

Figure 3:
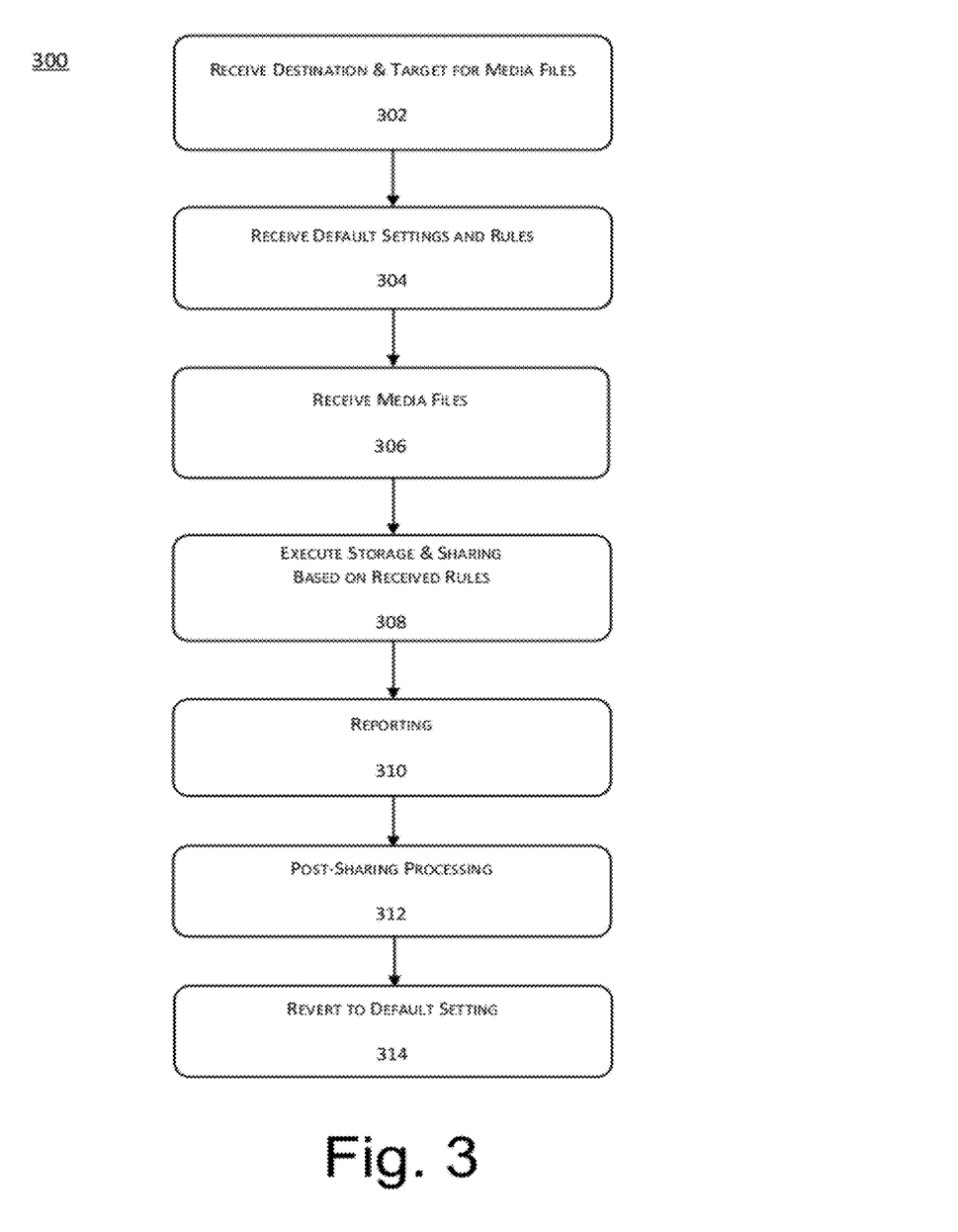
FIG. 3 shows a processing flow for at least an example cloud-based storage platform in accordance with one or more embodiments of preconfigured media file uploading and sharing.

FIG. 3 shows a processing flow for at least an example cloud-based storage platform in accordance with one or more embodiments of preconfigured media file uploading and sharing.

Example processing flow 300 may include one or more operations, actions, or functions as illustrated by one or more of blocks 302, 304, 306 308, 310, 312, and/or 314. Although illustrated as discrete blocks, various blocks may be divided into additional blocks, combined into fewer blocks, or eliminated, depending on the desired implementation. Further, various operations, actions, or functions illustrated by the blocks and sub-blocks of FIG. 2 and FIG. 3 may require interaction, collaboration, and/or coordination between an instance of client application 110 hosted on client device 108 and digital storage platform 102. Therefore, processing flow 200 and processing flow 300 may each stand alone. That is, both processing flows may be implemented exclusively of each other, although not all operations, actions or functions illustrated and described with regard to a particular one of the processing flows is exclusive thereto. Further still, as set forth above regarding processing flow 200, the settings described herein may be regarded are instructions to be implemented by various components or sub-components of system 100, either singularly or in combination.

In accordance with another example embodiment, processing flow 300 is described in the context of digital storage platform 102 which, in cooperation with an instance of client application 110 hosted on client device 108, may facilitate preconfigured media file uploading and sharing. Further, to the extent any of the blocks corresponding to processing flow 300 may include user 112 interacting with client application 110 and/or digital storage platform 102, such interaction is indeed implemented by client application 110 in coordination with digital storage platform 102. Processing flow 300 may begin at block 302.

Block 302 (Receive Destination & Target for Media Files) may include digital storage platform 102 interacting with client application 110 to receive a selection from user 112 of destination sharing site or service 116 from among the list of eligible destination sharing sites or services made available at block 204, as well as one of folders target A 118A and target B 118B, to which any of digital media files 114 may be uploaded and shared. Processing flow 300 may proceed to block 304.

Block 304 (Receive Default Settings and Rules) may include digital storage platform 102 interacting with client application 110 to receive a selection from user 112 of a default mode for storing captured digital media files 114 on client device 108 and at backup 104 on digital storage platform 102, as well as for sharing any of the stored digital media files 114 to the targeted one of folders target A 118A and target B 118B on the selected destination sharing site or service 116.

As set forth above regarding processing flow 200, a typical default mode may include a backup mode by which digital media files 114 captured by client device 108 are stored locally on client device 108 and also stored on backup 104 at digital storage platform 102.

Another non-exclusive option for the default mode, relevant to digital storage platform 102, includes a share mode by which digital media files 114 captured by client device 108 are stored locally on client device 108, stored on backup 104, and shared automatically to the targeted one of folders target A 118A and target B 118B on the selected destination sharing site or service 116.

Block 304 may further include digital storage platform 102 interacting with client application 110 to receive a selection from user 112 of rules for sharing digital media files 114 to the targeted one of folders target A 118A and target B 118B on the selected destination sharing site or service 116. Thus, rules 106 may be enforced, by which certain ones of digital media files stored at backup 104 are prohibited from being shared to either of folders target A 118A and target B 118B on sharing site or service 116 for any of various preferential, privacy, or safety reasons, as logic implemented by hardware, software, firmware, or any combination thereof. Filtering of the uploaded digital media files 114 stored on backup 104 prior to sharing thereof to the selected destination sharing site or service 116 may be implemented by, e.g., applying the exclusionary settings to tags or meta-data applied to all of stored digital media files 114. Processing flow 300 may proceed to block 306.

Block 306 (Receive Media Files) may include digital storage platform 102 interacting with client application 110 to receive digital media files 114 captured on device 108. Digital media files 114 may include digital photograph files, digital video files, digital audio files, graphics in both 2D and 3D, or any combination thereof. Alternative embodiments of preconfigured media file uploading and sharing, of course, may easily contemplate and cover the uploading and sharing of non-digital files. Processing flow 300 may proceed to block 308.

Block 308 (Execute Storage & Sharing Based on Received Rules) may be executed based on an assumption that any of the mode, rules, or settings received at block 304 includes enablement of storage of uploaded digital media files 114 to backup 104 on digital storage platform 102 and, further, sharing of such stored digital media files 114 to the targeted one of folders target A 118A and target B 118B on the selected destination sharing site or service 116. Therefore, block 308 may include digital storage platform 102 executing on the mode, rules, or settings received at block 304 to store digital media files 114 automatically uploaded from client device 108 to backup 104 on digital storage platform 102 and, further, sharing such stored digital media files 114 to the targeted one of folders target A 118A and target B 118B on the selected destination sharing site or service 116. Processing flow 300 may proceed to block 310.

Block 310 (Reporting) may include digital storage platform 102, in coordination with client application 110 hosted on client device 108, providing an indication of the automatic uploading and/or sharing executed at block 308. Processing flow 300 may proceed to block 312.

Block 312 (Post-Sharing Processing) may include digital storage platform 102, in coordination with client application 110 hosted on client device 108, providing user 112 with an opportunity to retract the sharing of any of automatically uploaded and shared digital media files 114 to the targeted one of folders target A 118A and target B 118B on the selected destination sharing site or service 116.

More particularly, subsequent to the reporting at block 310, digital storage platform 102, in coordination with client application 110 hosted on client device 108, may provide a "delete" or "retract" option to user 112. Such option may be made available automatically for a predetermined amount of time, or the option may be alternatively selected by user 112 from a menu of options made available by client application 110, which may then coordinate with digital storage platform 102 to execute the deletion or retraction when such option is selected by user 112.

Block 314 (Revert to Default Setting) may include digital storage platform 102, in coordination with client application 110 hosted on client device 108, automatically reverting the instance of client application 110 to a default setting or, more particularly, a non-sharing mode. The processing at block 314 is optional, and is a privacy/safety feature of pass-through sharing.

As described above, no-click upload and pass-through sharing facilitate automatic back-up and real-time sharing of digital media files captured on a client device while further providing for the privacy and safety of the user of such device.

Exemplary Cloud-Based Environment

Figure 4:
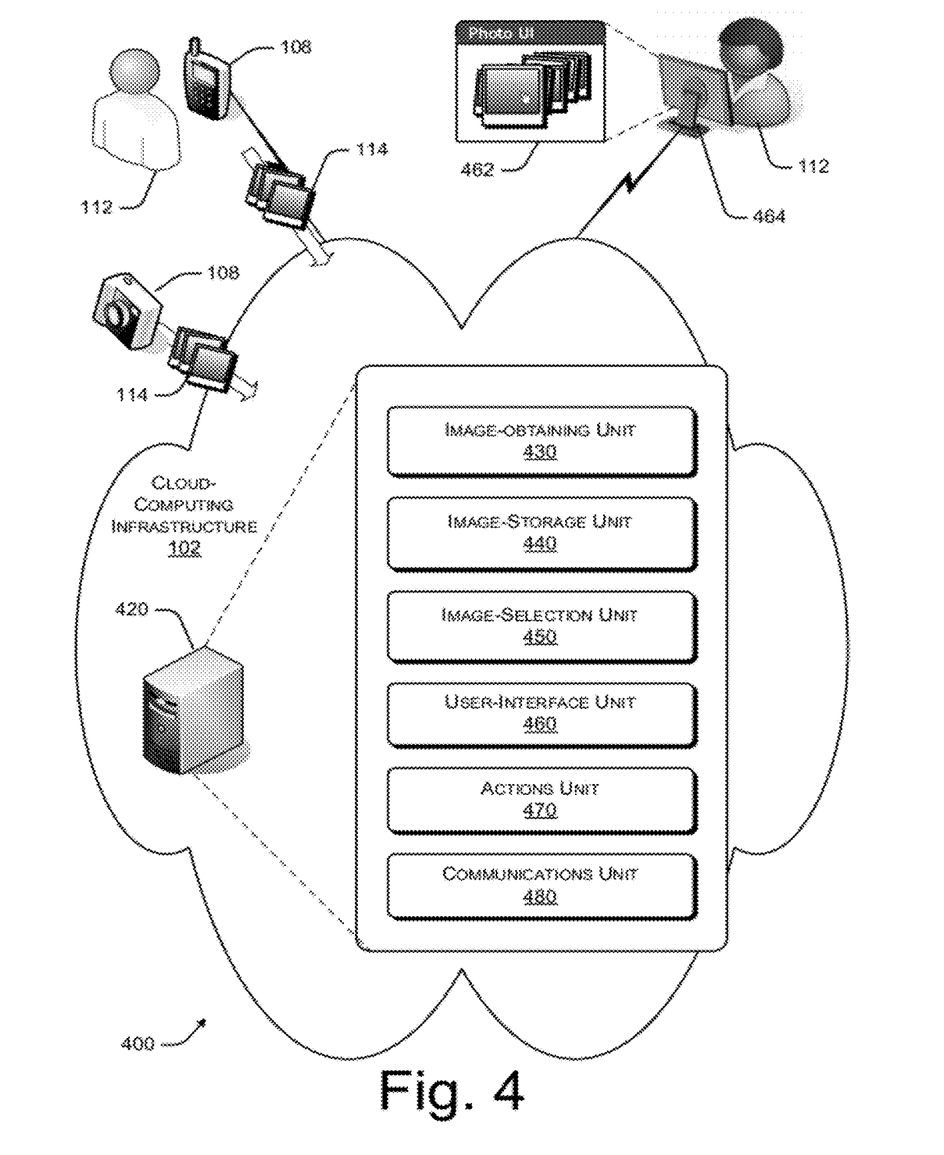
FIG. 4 shows an exemplary cloud-based environment within which one or more embodiments of preconfigured media file uploading and sharing may be implemented.

FIG. 4 illustrates an exemplary cloud-based environment 400 in which the techniques for preconfigured digital media uploading and sharing described herein may be implemented. User 112 may be depicted with her camera-equipped smartphone, i.e., client device, 108. The smartphone 108 may be configured to send one or more photos 114 captured or acquired by the smartphone to a cloud-computing infrastructure, i.e., digital storage platform, 102. Likewise, digital camera 108 may be configured to send one or more photos 114 captured or acquired by the camera to the cloud-computing infrastructure 102.

In at least one embodiment, an exemplary image-capture device, e.g., smartphone 108, may be what is commonly referred to as a "mobile phone," "smartphone," or "cellphone." However, the described techniques may be used in conjunction with non-cellular technologies such as conventional analog AM or FM radio, Wi-Fi™, wireless local area network (WLAN or IEEE 802.11), WiMAX™ (Worldwide Interoperability for Microwave Access), Bluetooth™, and other analog and digital wireless voice and data transmission technologies. Alternative implementations of such devices might not have any telecommunications or wireless communication capability. Still other alternative implementations may utilize a wired communication link instead of or in addition to wireless communication.

Exemplary devices 108 are not limited to those having a camera. Any device with the capability to acquire, collect, and/or manipulate digital images, videos, or audio files may implement some aspect of the techniques discussed herein. Examples of such alternative devices include (but are not limited to) the following: tablet-based computer, other handheld computer, netbook, computer, digital camera, digital camcorder, handheld multimedia device, GPS navigational system, vehicle-based computer, or other portable electronics.

Within cloud-computing infrastructure 102 exists one or more cloud-computing resources which implement, at least in part, the techniques described herein. Cloud-computing infrastructure 102 may provide computing resources and data storage may be provided via linked data centers. Each of the data centers may include a plurality of servers that provide computing resources, as well as data storage and retrieval capabilities. Users of cloud-computing infrastructure 102 generally do not need knowledge regarding or control over the underlying data center infrastructure of the cloud. Rather, the users may access the computing resources and data storage capabilities on an as-needed basis. While depicted in FIG. 4 as cloud-computing infrastructure, feature 102 may alternatively be viewed as a network or the Internet.

The relevant cloud-computing resources are depicted here as a server 420. Server 420 may be or be part of a web server, data center, or other computing resource. Server 420 is shown in an expanded view and includes, for example, an image-obtaining unit 430, an image-storage unit 440, an image-selection unit 450, a user-interface unit 460, an actions unit 470, and a communications unit 480.

Each of units 420, 430, 440, 450, 460, 470, and 480 may be implemented (at least in part) by a set of processor-executable instructions, e.g., software modules. Furthermore, each of these units may include or employ one or more lower-level components of server 420. For example, these lower-level components include processors, memory, storage, video display, user-input device, e.g., keyboard, transceiver, and the like. Alternatively, each of these units and/or some or all of their functions may be distributed across multiple servers and other resources in cloud-computing infrastructure 102. Alternatively still, each of these units and/or some or all of their functions may be distributed across multiple cloud-connected devices, such as device 108.

Image-obtaining unit 430 may be configured, designed, and/or programmed to acquire digital images from multiple sources, including but not limited to cloud-connected image-capture devices such as device 108. Image-obtaining unit 430 may include various image finding, formatting, conversion, processing, and/or analysis components. Image-obtaining unit 430 may be implemented, at least in part, by a software module resident, at least in part, in a memory and executed by one or more processors.

In addition, image-obtaining unit 430 may include or have associated therewith an image-handling software module, e.g., application, that may be used to enhance an amount of information recorded in the image file relating to the captured digital images. For example, the image-handling application may use information from other sources and/or applications to add data to the image files, e.g., JPEG (Joint Photographic Experts Group), TIFF (Tagged Image File Format), RAW, PNG (Portable Network Graphics), etc., that the captured digital images 114 are stored on image-storage unit 440. This added data may be called "metadata." Specifically, the image-handling application may be configured to obtain information from other hardware, firmware, or software components to add data to the image files. Examples of other components include, but are not limited to, a location application, a calendar application, and/or a contacts application running.

Additionally, the image-handling application may be designed to enhance user functionality once images have been acquired. For example, the image-handling application may also be configured to display images to the user in cooperation with or as part of image-interaction unit 460. The image-handling application may include various filters or criteria used to limit the number of images displayed/sent to the user. As discussed below, these filters or criteria may be user selectable, may use the data in the image file obtained from non-image sources or applications, may be configured based on data in the image files, etc. As another example, similar filters or criteria may also be used to cluster images into folders, e.g., virtual albums, system file folders, etc. As still another example, the image-handling application may use data stored in the image files, contact information, calendar information, and/or upload information to increase the ease of sharing images.

The image-handling application may be limited to a particular type of digital image, e.g., still images (photographs), moving images (video), graphics in both 2D and 3D, etc., or may be configured to handle multiple types of images. In addition, the image-handling application may be a stand-alone application, or may be integrated into other applications or other units. Moreover, the image-handling application may be formed by a combination of functions of separate, distinct programs or units of the server 420.

Image-storage unit 440 may be configured, designed, and/or programmed to store digital images and possibly other forms of data and software. That is, server 420 may store the photos acquired by image-obtaining unit 430 from multiple sources.

Image-storage unit 440 may include one or more lower-level memory or storage components for storing still digital images, i.e., photographs or photos and/or moving digital images with audio, i.e., digital video. The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the server 420, attached externally to server 420, or available via data communications.

Image-selection unit 450 may be configured, designed, and/or programmed to automatically select a group of top-ranked (or alternatively bottom-ranked) photos of a collection of such photos stored by image-storage unit 440, which are presumably acquired from multiple image-capturing sources. Alternatively, image-selection unit 450 may cluster the collection of photos before the auto-selection is performed. Further still, image-selection unit 450 may cluster the auto-selected group of photos after the auto-selection is performed.

Image-selection unit 450 shown in FIG. 4 may be implemented as a software module which would reside, at least in part, in the memory and be executed by one or more processors. Alternatively, image-selection unit 450 may be implemented as a collection of, or as part of, dedicated hardware or firmware. Further still, image-selection unit 450 may be implemented as a combination of hardware, firmware, or software.

User-interface unit 460 may be configured, designed, and/or programmed present an auto-selected photo user interface, like photo UI 462, to a user and perhaps obtain feedback. For example, using photo UI 462 on a cloud-connected computer 464, user 112 may view the auto-selected photos and, in some implementations, provide feedback. That feedback may indicate her approval of or disapproval of the photos that were auto-selected. Of course, other users may view the photos and provide feedback as well.

User-interface unit 460 may be implemented as a software module which resides, at least in part, in the memory and can be executed by one or more processors. Alternatively, image-selection unit 450 may be implemented as a collection of or as part of dedicated hardware or firmware. Further still, image-selection unit 450 may be implemented as a combination of hardware, firmware, or software.

Actions unit 470 may be configured, designed, and/or programmed to automatically perform a defined action on each photo in a group of top-ranked (or alternatively bottom-ranked) photos of a collection of such photos stored by image-storage unit 440. Presuming the photos are top-ranked, the defined actions include (by way of example and not limitation): archiving, sharing, printing, conversion/reformat, and the like. Presuming the photos are bottom-ranked, the defined actions include (by way of example and not limitation): deleting, recycling, and the like.

Archiving photos involves storing photos in a different and perhaps more reliable location. Sharing photos includes sending copies of the photos to another person via one or more various ways of sending such data or notices of the same. Alternatively, sharing photos includes sending a link to one or more of the photos via one or more various ways of sending such links or notices of the same. Examples of such ways to send photos, links, and/or notices thereof include, but are not limited to: email, posting on a sharing site or service, posting on a blog or website, text message, MMS (multimedia messaging service), and the like. Printing photos is much like sharing photos, but the destination is a printer capable of printing the shared photos. Also, the photos may be automatically converted or reformatted in a pre-defined manner.

Deleting photos involves permanently removing the photo from the image-storage unit 540. Recycling photos involves placing the photo into a queue of files to be deleted later. This queue is sometimes called the "trash" or "recycle bin."

Actions unit 470 shown in FIG. 4 may be implemented as a software module which would reside, at least in part, in the memory and be executed by one or more processors. Alternatively, actions unit 470 may be implemented as a collection of or as part of dedicated hardware or firmware. Further still, actions unit 470 may be implemented as a combination of hardware, firmware, or software.

Communications unit 480 may be configured, designed, and/or programmed to transmit (and/or receive) notifications of, links to, and/or copies of digital photos through and possibly outside of the cloud-computing infrastructure 102 and onto another user or device accessible from that infrastructure.

The communications unit 480 may include various lower-level communications components for sending and/or receiving data communications from/by the resources of the cloud-computing infrastructure 102. Using a transceiver, transmitter, receiver, network interface controller (NIC), and the like, communications unit 480 utilizes wired, e.g., universal serial bus (USB) or Ethernet or wireless communications. Examples of wireless communications are, by way of example and not limitation: cellular, satellite, conventional analog AM or FM radio, Wi-Fi™, wireless local area network, WiMAX™, and other analog and digital wireless voice and data transmission technologies. The communications unit 480 may be implemented, at least in part, by a software module resident, at least in part, in a memory and executed by one or more processors.

Exemplary Image-Capturing Telecommunications Device

Figure 5:
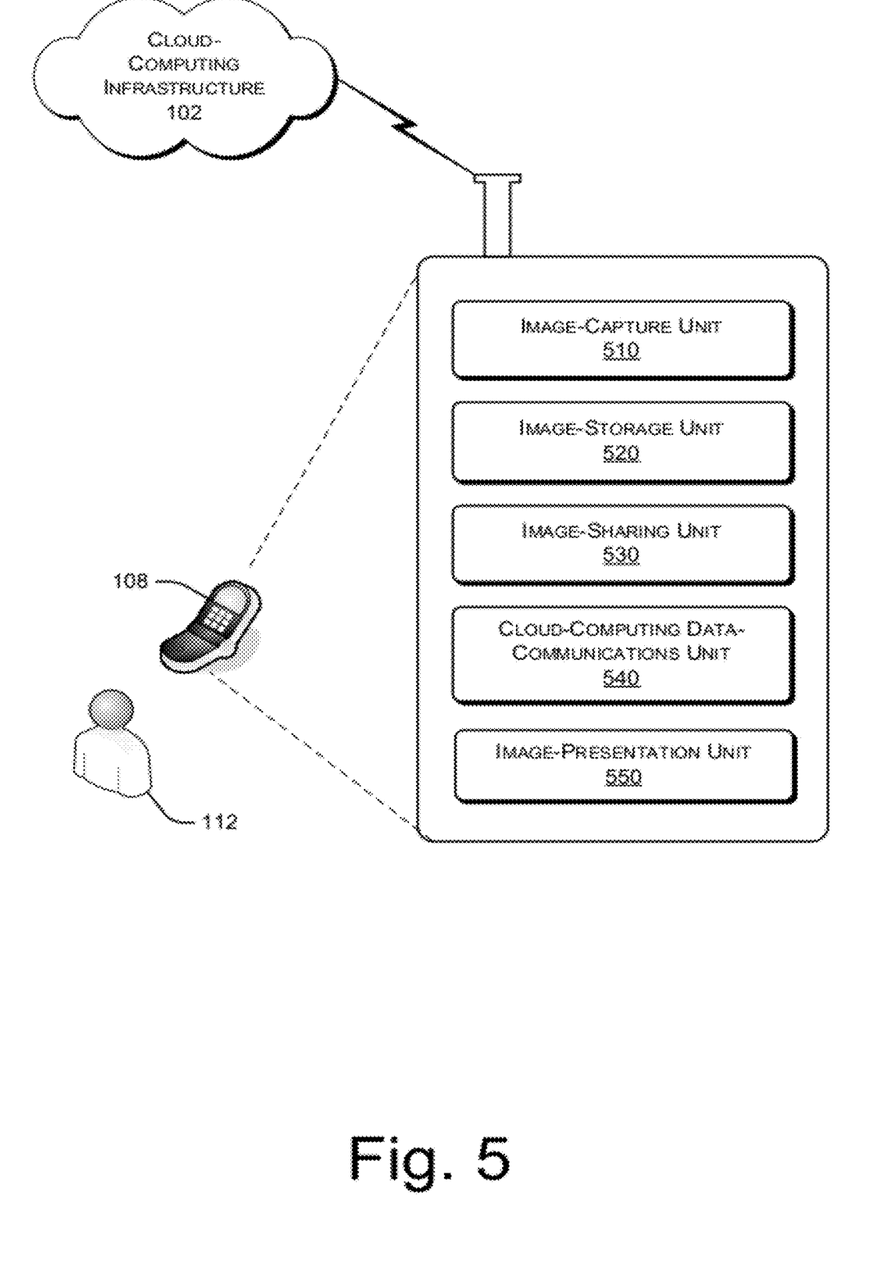
FIG. 5 shows an example client device that is configured to implement one or more embodiments of preconfigured media file uploading and sharing.

FIG. 5 shows an exemplary image-capturing telecommunications device 108 that may implement, at least in part, the techniques described herein for automatic selection of a group of photos from a larger set of photos collected from multiple sources. The device 108 is one of those sources.

The image-capturing telecommunications device 108 may have the following components, each of which may be implemented as a single component or as a combination of multiple components: an image-capturing unit 510, an image-storage unit 520, an image-sharing unit 530, a cloud-computing data-communications unit 540, and an image-presentation unit 550.

Image-capturing unit 510 may be configured, designed, and/or programmed to capture digital images. That is, a person using device 108 may take photos using image-capturing unit 510 of the device.

Image-capturing unit 510 may include various lower-level camera components for capturing still digital images, i.e. photographs or photos and/or moving digital images with audio, i.e., digital video. The camera components may include, by way of example and not limitation: digital sensor chip, e.g., CCD (charge-coupled device) or CMOS (complementary metal-oxide-semiconductor), lenses, display, viewfinder, and the like. Image-capturing unit 510 may be implemented, at least in part, by a software module resident, at least in part, in the device's memory and executed by one or more processors of device 108.

Image-storage unit 520 may be configured, designed, and/or programmed to store digital images and possibly other forms of data and software. That is, device 108 may store the photos taken by the person using device 108 on image-storage unit 520 of the device.

Image-storage unit 520 may include one or more lower-level memory or storage components for storing still digital images, i.e., photographs or photos and/or moving digital images with audio, i.e., digital video. The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the device 108, attached externally to the device 108, or available via data communications.

Digital images 114 stored by image-storage unit 520 may include images captured by image-capturing unit 510, and/or may include images obtained from sources other than image-capturing unit 510. For example, images may be transferred to device 108 using one or more wireless and/or wireline interfaces from cloud-computing infrastructure 510.

Image-sharing unit 530 may be designed, configured, and/or programmed to share one or more of the stored captured digital images via cloud-computing infrastructure 510. Sharing may include sending a notice about one or more images to one or more particular users. Sending a notice may include, but is not limited to: sending copies of a shared image; sending a link to one or more shared images; posting a link to one or more shared images; and uploading shared images to a website, blog, social-networking service, photo/video sharing services, or the like.

Cloud-computing data-communications unit 540 may be designed, configured, and/or programmed to communicate with the cloud-computing infrastructure via a data-communications link. Furthermore, cloud-computing data-communications unit 540 may be designed, configured, and/or programmed to send and/or receive a group of digital images to/from cloud-computing infrastructure 510. Instead of sending/receiving the images themselves, cloud-computing data-communications unit 540 may send/receive information about such images, which may include links to one or more of the images. In one or more implementations, that received group includes at least one of the digital images shared by image-sharing unit 530.

Image-presentation unit 550 may be designed, configured, and/or programmed to present the group of digital images to user 112 of device 108. The group of digital images is provided by cloud-computing infrastructure 510. The group is a superlative, e.g., top-ranked, subset of a set of digital images. The subset is ranked by cloud computing infrastructure 510 in accordance with weighted selection criteria.

Image-presentation unit 550 may include various lower-level audio/visual presentation components for showing still digital images, i.e., photographs or photos and/or moving digital images with audio, i.e., digital video. The audio/visual components may include, by way of example and not limitation: a liquid crystal display (LCD), a flat panel, organic light-emitting diode (OLED) displays, pico-projection displays, a solid state display or other visual display devices, speakers, and the like. The image-presentation unit 550 may be implemented, at least in part, by a software module resident, at least in part, in the device's memory and executed by one or more processors of the device.

Additional and Alternative Implementation Notes

Digital cameras and camera-equipped mobile phones are depicted herein as being examples of sources of photos for one or more implementations of the techniques described herein. However, other image-capturing devices may be sources of photos for this and other implementations of the techniques described herein. Examples of other image-capturing devices that may be sources include (by are not limited to): tablet-based computer, other handheld computer, netbook, computer, digital camera, digital camcorder, handheld multimedia device, digital single-lens reflex (DSLR) camera, GPS navigational system, vehicle-based computer, any camera-equipped computing device or portable electronic.

In addition, non-camera-equipped sources may be utilized for this and other implementations of the techniques described herein. These non-camera-equipped sources include other devices or services where images are stored, collected, accessed, handled, manipulated, and/or viewed. Examples of such alternative image sources may include, but are not limited to: a photo-processing kiosk, portable and removable storage media or device, e.g., CD-ROM, DVD-ROM, other optical media, USB flash drive, flash memory card, external hard drive, etc., electronics with radio-frequency identification (RFID), a social-networking site, e.g., Facebook™, MySpace™, Twitter™, Linkedin™, Ning™, and the like, and photo/video sharing services, e.g., Flickr™, Photobucket™, Picasa™, Shutterfly™, and the like.

One or more implementations of the techniques described herein may include an initial training session for an exemplary auto-selecting device or service to learn what makes a photo and/or video clip superlative (e.g., best or worst) in the user's opinion. This training may be repeated from time to time. This training will set the weight values of one or more of the weighted criteria. There may be various profiles for specific conditions and situations where the weighted criteria have their own trained values. Each user of the exemplary auto-selecting device or service may have their own customized weighted criteria values and profiles of such values. The exemplary may have a default set of values or profiles assigned. That default set or profiles may be extrapolated from a statistically evaluation (e.g., mean or median) of the trained values derived from multiple users.

Instead of a training session, one or more implementations may take advantage of a system of user-ratings (e.g., thumbs up/down or 1 to 5 stars) for photos and/or video clips. These user-rating are effective data for training the exemplary video-capture device to learn what makes a photo and/or video clip superlative (e.g., best or worst) in the user's opinion. In some implementations, the user may define values for one or more of the weighted criteria. This may be accomplished using, for example, slider-bar user interface for the user to adjust weights assigned to particular criteria or to categories of criteria.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media and/or computer-readable medium that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

We claim:

1. A file sharing system, comprising:
   one or more client devices; and
   a cloud-based storage platform configured to:
   receive media storage settings via user input from a client device of the one or more client devices, the media storage settings including one or more rules associated with storage of media files on the cloud-based storage platform, wherein the media storage settings include at least one setting for storing the media file on the cloud-based storage;
   capture, from the client device, a media file that includes media content, based at least in part on the media storage settings, the media content comprising one of an image, a video, or a graphic;
   extract, via an image-handling application, from one or more information sources other than the media file, metadata associated with the media content, the metadata including location information, calendar information or contact information associated with the media content, wherein the one or more information sources include a location application, a calendar application, and a contacts application;
   configure, via the image-handling application, filter criteria for the media file using the metadata captured from the one or more information sources and the media storage settings;
   associate the filter criteria with the media file;
   store the media file within a cluster of stored media files, based at least in part on the filter criteria, wherein the media storage settings further include an additional setting to share a subset of media files within the cluster of stored media files to a targeted folder on a web-based service, the subset of media files including the media file;
   receive, via a user selection, defined values for one or more weighted criteria to generate a ranking associated with individual media files of the subset of media files;
   generate, independent of user interaction, one or more rankings associated with the subset of media files, based at least in part on the one or more weighted criteria;
   select at least a portion of the subset of media files to automatically share at the targeted folder on the web-based service, based at least in part on the additional setting and the one or more rankings; and
   share the portion of the subset of media files at the targeted folder on the web-based service.

2. The file sharing system of claim 1, wherein the media storage settings are associated with the media file captured from the client device.

3. The file sharing system of claim 1, wherein the at least one setting for storing instructs that the media file is to be stored on the client device and that the media file is to be backed-up privately on the cloud-based storage platform.

4. The file sharing system of claim 1, wherein the additional setting for sharing instructs that the media file is to be stored on the client device, the media file is to be backed-up privately on the cloud-based storage platform.

5. The file sharing system of claim 1, wherein the additional setting for sharing prohibits sharing of the subset of media files within the cluster of stored media files to the web-based service in accordance with a preconfigured rule included in the additional setting for sharing.

6. The file sharing system of claim 1, wherein the additional setting for sharing includes a time limit after which a mode corresponding to the additional setting for sharing expires.

7. A media sharing method, comprising:
   obtaining a first set of settings, by way of a client device, for backing up media files as backed-up media files, to an external storage platform, wherein the first set of settings include instructions to store uploaded media files to the external storage platform;
   obtaining a second set of settings, by way of the client device, for sharing the backed-up media files to at least one targeted folder on a destination sharing site, wherein the second set of settings include instructions to share at least a portion of the uploaded media files stored on the external storage platform to the targeted folder on the destination sharing site;
   disseminating the first set of settings and the second set of settings to the external storage platform;

capturing one or more media files that include media content, the media content comprising one of an image, a video, or a graphic;

extracting, via an image-handling application, metadata from one or more information sources other than the one or more media files, the metadata including location information, calendar information or contact information associated with the media content, wherein the one or more information sources include a location application, a calendar application, and a contacts application;

configuring, via the image-handling application, filter criteria for the one or more media files, based at least in part on the metadata from the one or more information sources;

storing a subset of the one or more media files, based at least in part on the first set of settings and the filter criteria;

receiving, via a user input on a client device, defined values for one or more weighted criteria to generate a ranking associated with individual media files of the subset of the one or more media files;

analyzing the subset of the one or more media files, based at least in part on the one or more weight criteria;

generating, independent of user interaction, one or more rankings associated with the individual media files, based at least in part on an analysis of the subset of the one or more media files; and uploading at least a portion of the subset of the one or more media files to the external storage platform for sharing on the at least one targeted folder in accordance with the second set of settings, based at least in part on the one or more rankings.

8. The media sharing method of claim 7, wherein the second set of settings for sharing the backed-up media files include instructions to prohibit at least an additional portion of the uploaded media files stored to the external storage platform from being shared on the destination sharing site and expiration time setting.

9. The media sharing method of claim 7, wherein storing the one or more media files is executed without user activation subsequent to capturing the one or more media files.

10. The media sharing method of claim 7, wherein uploading is executed without user activation subsequent to storing the one or more media files.

11. A non-transitory computer-readable medium storing instructions that, when executed, cause one or more processors to:

obtain a first set of settings for privately backing up media files as privately backed up media files to an external storage platform, wherein the first set of settings include instructions to store uploaded media files to the external storage platform;

obtain a second set of settings for sharing the privately backed up media files to at least one targeted folder on a destination site, wherein the second set of settings include instructions to share at least a portion of the uploaded media files stored on the external storage platform to the targeted folder on the destination site;

disseminate the first set of settings and the second set of settings to the external storage platform;

receive one or more media files that includes media content, the media content comprising one of an image, a video, or a graphic;

extract, via an image-handling application, metadata from one or more information sources other than the one or more media files, the metadata including location information, calendar information or contact information associated with the media content, wherein the one or more information sources include a location application, a calendar application, and a contacts application;

configure, via the image-handling application, filter criteria for the one or more media files, based at least in part on the metadata from the one or more information sources;

receive, via a user input on a client device, defined values for one or more weighted criteria to generate a ranking associated with individual media files of the one or more media files;

analyze the one or more media files, based at least in part on the one or more weighted criteria;

generate, independent of user interaction, one or more rankings associated with the individual media files of the one or more media files, based at least in part on an analysis of the one or more media files;

privately store a subset of the one or more media files as stored media files, based at least in part on the first set of settings and the filter criteria; and share at least a portion of the stored media files to the at least one targeted folder, based at least in part on the second set of settings for sharing, based at least in part on the one or more rankings.

12. The non-transitory computer-readable medium of claim 11, wherein the non-transitory computer-readable medium is included in a cloud-based digital storage platform.

13. The non-transitory computer-readable medium of claim 11, wherein the second set of settings for sharing are time-based.

14. The non-transitory computer-readable medium of claim 11, further comprising at least one instruction that, when executed, causes the one or more processors to report sharing of the portion of the stored media files to the at least one targeted folder.

15. The non-transitory computer-readable medium of claim 11, further comprising at least one instruction that, when executed, causes the one or more processors to retract at least the portion of the stored media files from the at least one targeted folder.

16. The media sharing method of claim 7, further comprising:

determining that the portion of the subset of the one or more media files are a group of top-ranking media files, based at least in part on the one or more rankings; and uploading the portion of the subset of the one or more media files to an additional target folder on the destination sharing site.

17. The media sharing method of claim 7, further comprising:

determining that the portion of the subset of the one or more media files are a group of bottom-ranking media files, based at least in part on the one or more rankings; and archiving the portion of the subset of the one or more media files at an additional target folder on the destination sharing site.

* * * * *